(12) United States Patent
Seki

(10) Patent No.: US 6,386,709 B1
(45) Date of Patent: May 14, 2002

(54) PROJECTION DISPLAY UNIT

(75) Inventor: Toshihide Seki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 163 days.

(21) Appl. No.: 09/585,082

(22) Filed: Jun. 1, 2000

(30) Foreign Application Priority Data

Aug. 18, 1999 (JP) .......................................... 11-231262

(51) Int. Cl.$^7$ ............................................... G03B 21/14
(52) U.S. Cl. ......................................... 353/38; 353/102
(58) Field of Search ........................... 353/20, 38, 102; 349/5, 8, 9

(56) References Cited

U.S. PATENT DOCUMENTS

| | | | |
|---|---|---|---|
| 5,786,939 A | * | 7/1998 | Watanabe ..................... 353/38 |
| 6,257,726 B1 | * | 6/2001 | Okuyama ..................... 353/38 |
| 6,286,961 B1 | * | 9/2001 | Ogawa ......................... 353/38 |

FOREIGN PATENT DOCUMENTS

| | | |
|---|---|---|
| JP | A5346557 | 12/1993 |
| JP | A8304739 | 11/1996 |

* cited by examiner

Primary Examiner—William Dowling

(57) ABSTRACT

A projection display unit which has a light source, a reflecting mirror for reflecting a light pencil from the light source, a first multilens array for dividing a light pencil gathered by the reflecting mirror into a plurality of light pencils, a second multilens array for forming an image of the first multilens array, a polarization conversion element for converting light pencils in an irregular polarization state into linearly polarized light, a condenser having positive power for superposing the light pencils provided through the multilens array, a collimator lens having positive power for correcting the angle of a light beam, a display element for forming an image by electric modulation, a projection lens for enlarging and projecting the image formed on the display element, and a correction lens being disposed between the condenser and the collimator lens for correcting the light pencil.

15 Claims, 16 Drawing Sheets

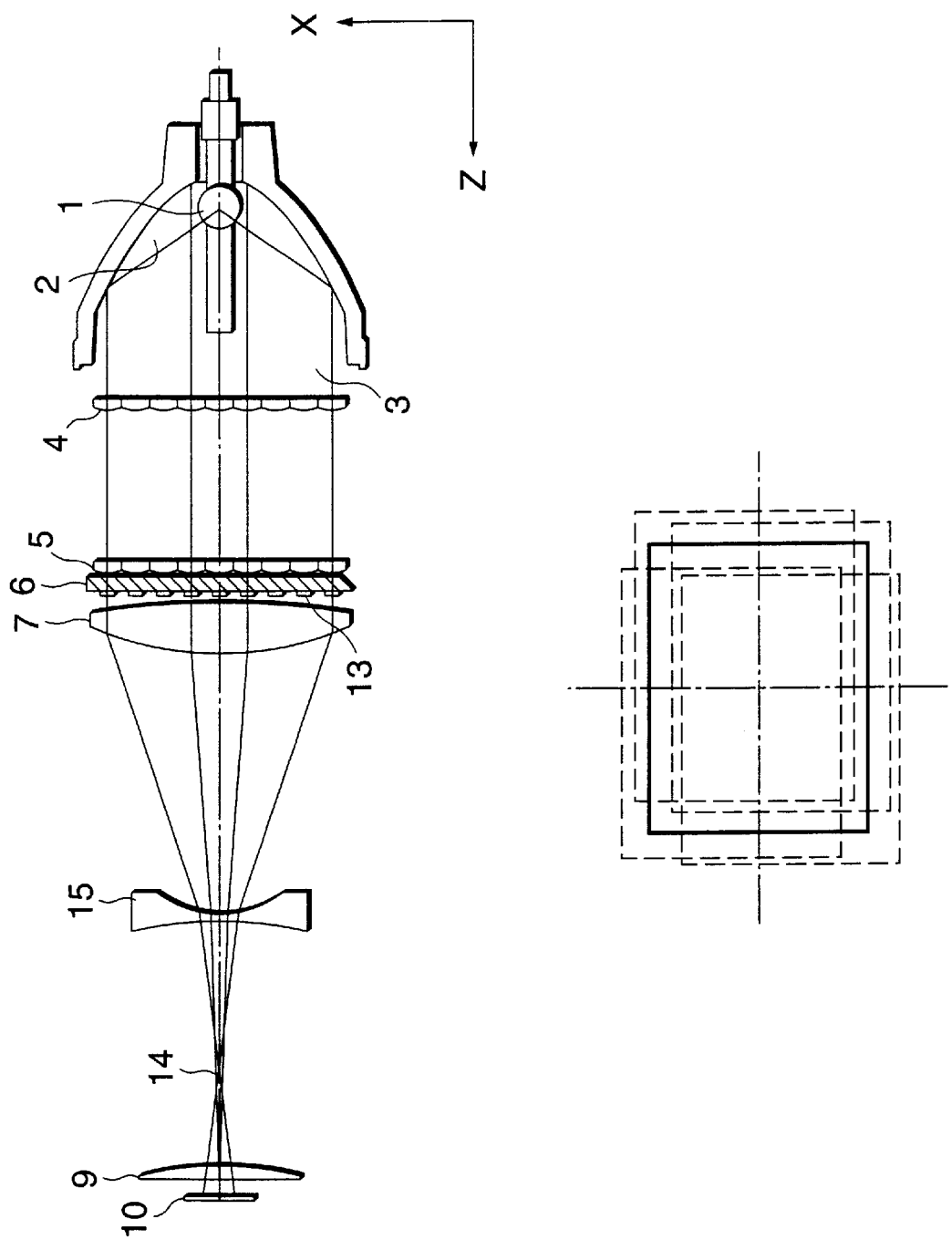

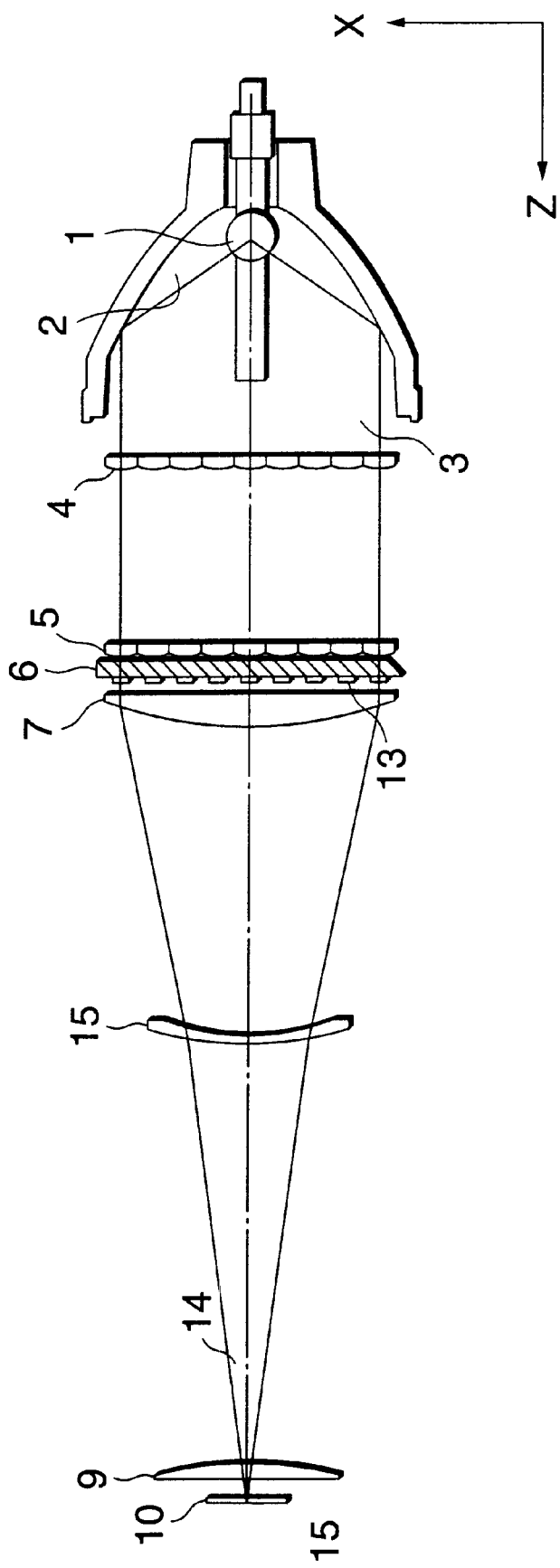

PROJECTION DISPLAY UNIT

BACKGROUND OF THE INVENTION

1. Field of the Invention

This invention relates to a display unit for projecting a small-sized display element on an enlarged scale, such as a liquid crystal projector.

2. Description of the Related Art

FIG. 14 shows an optical system of a liquid crystal projector in a related art. A light pencil emitted from a lamp 1 is reflected by a reflecting mirror 2 to form a roughly collimated light pencil 3. This collimated light pencil 3 is incident on a multilens array A4 and is divided into a plurality of light pencils. The provided light pencils are incident on a corresponding multilens array B5 and guide to a polarization conversion element 6 for making polarized light uniform. The light pencil with the polarized light made uniform is emitted through a condenser 7 as a condensed light pencil. The light pencil emitted through the condenser 7 changes in direction 90 degrees through a lens 8 and is incident on a dichroic mirror 20. The dichroic mirror 20 allows red light to pass through and reflects blue light and green light. The passing-through red light has an optical path bent through a reflecting mirror 22, undergoes a light beam angle correction through a collimator lens 9R, and illuminates a liquid crystal panel 10R. The green light and blue light reflected by the dichroic mirror 20 are incident on a dichroic mirror 21, which then reflects the green light and allows the blue light to pass through. The reflected green light undergoes a light beam angle correction through a collimator lens 9G and illuminates a liquid crystal panel 10G. The blue light passing through the dichroic mirror 21 has an optical path bent through a reflecting mirror 23, passes though a lens 18, and again has an optical path bent through a reflecting mirror 24. Then, the blue light passes through a collimator lens 9B and illuminates a liquid crystal panel 10B.

The liquid crystal panel 10R modulates the projected light by a red video signal and displays an image. Thus, the light is allowed to pass through or is shielded selectively on the liquid crystal panel. The passing-through light is incident on a dichroic prism 11, has an optical path bent by a reflection face 11R, and is incident on a projection lens 12. The liquid crystal panel 10G modulates the projected light by a green video signal and the light passing through the liquid crystal panel 10G is incident on the dichroic prism 11 and is incident on the projection lens 12 as it is. Likewise, the light incident on the liquid crystal panel 10B is incident on the dichroic prism 11, has an optical path bent by a reflection face 11B, and is incident on the projection lens 12. The red light, green light, and blue light incident on the projection lens 12 are combined and projected on an enlarged scale as a full-color image.

FIG. 15 shows a part of the optical path of the projection display unit in the related art.

FIG. 15 shows a state in which the optical path from the lamp 1 through the liquid crystal panel 10G to the projection lens 12 is extracted from the optical path in FIG. 14 and is aligned on a line without showing the mirrors for changing the light beam directions. However, the dichroic prism 11 is not shown.

The light pencil emitted from the lamp 1 is reflected by the reflecting mirror 2 to form the collimated light pencil 3. The collimated light pencil 3 is divided into a plurality of light pencils through the multilens array A4 for narrowing the light pencil toward the corresponding multilens array B5. The multilens array B5 has a role of maintaining the corresponding multilens array A4 and the display element 10 in conjugate relation. The light pencils passing through the multilens array B5 are incident on the polarization conversion element 6 and are divided into two linearly polarized light pencils orthogonal to each other. One of the light pencils rotates the vibration face of the polarized light 90 degrees by means of a phase difference plate 13 disposed on the emission face of the polarization conversion element 6. Therefore, all light incident on the condenser 7 becomes linearly polarized light with the vibration face made uniform. The condenser 7 has a role of superposing images of the multilens array A4 formed on the multilens array B5 on the display element 10. The collimator lens 9 before the display element 10 has a role of making even incidence angles of light beams in the display element 10 plane.

In FIG. 15, attention is focused on a light beam angle 14 toward the center of the display element 10. The magnitude of the light beam angle 14 is almost inversely proportional to the distance from the condenser 7 to the display element and is almost proportional to the light pencil diameter passing through the condenser 7. Since the light passing through the display element 10 is input to the projection lens 12 and is projected on an enlarged scale, the light incidence angle 14 on the display element 10 needs to be made equal to an input angle 19 to the projection lens 12.

The projection display unit in the related art is thus configured, wherein the projection lens 12 is limited by the magnitude of the input angle 19 and the outer dimensions of projection lens 12 are determined. The characteristics of the resolution, distortion of a projection screen, and uniformity of brightness in a projection screen, performance proper to the projection lens 12 make it difficult to design and manufacture as the input angle 19 grows; this is a problem.

Further, if the length from the condenser 7 to the display element 10 is lengthened, as shown in FIG. 16, to lessen the light beam angle 14 or the input angle 19, the placement space of the parts needs to be taken larger than that in FIG. 15 and thus the outside shape of the projection display unit becomes large; this is a problem.

Alternatively, if a method of lessening the light pencil diameter passing through the condenser 7 for lessening the light beam angle 14 or the input angle 19 is adopted as shown in FIG. 17, the following problems arise: A sufficient amount of light does not arrive at the display element 10, heat is generated due to light lost by lessening the light pencil diameter, stray light is produced due to scattering of light, etc.

SUMMARY OF THE INVENTION

It is therefore an object of the invention to provide a small-sized system comprising a lens for correcting a light pencil incident on a display element or the light beam angle of the light pencil. It is another object of the invention to provide a system good in light use efficiency by placing the numbers of lens cells and the lens cell sizes of two multilens arrays used with a projection display unit in appropriate relationship.

In order to achieve the above objects, according to a first aspect of the invention, there is provided a projection display unit comprising: a light source for projecting an image; a reflecting mirror for reflecting a light pencil emitted from the light source; a first multilens array for dividing a light pencil gathered by the reflecting mirror into a plurality of light pencils; a second multilens array for forming an image of light pencil emitted from the first multilens array; a polarization conversion element for converting light pencils in an irregular polarization state emitted from the second multi lens array into linearly polarized light; a condenser having positive power for superposing the light pencils provided through the second multilens array; a collimator lens having positive power for correcting the angle of a light beam; a display element for forming an image by electric modulation; a projection lens for enlarging and projecting the image formed on the display element; and a correction lens being disposed between the condenser and the collimator lens for correcting a light pencil incident on the display element.

According to a second aspect of the invention, there is provided a projection display unit comprising: a light source for projecting an image; a reflecting mirror for reflecting a light pencil emitted from the light source; a first multilens array for dividing a light pencil gathered by the reflecting mirror into a plurality of light pencils; a second multilens array for forming an image of light pencil emitted from the first multilens array; a polarization conversion element for converting light pencils in an irregular polarization state emitted from the second multilens array into linearly polarized light; a condenser having positive power for superposing the light pencils provided through the second multilens array; a collimator lens having positive power for correcting the angle of a light beam; a display element for forming an image by electric modulation; and a projection lens for enlarging and projecting the image formed on the display element, wherein the number of lens cells of the second multilens array is less than that of the first multilens array.

According to a third aspect of the invention, there is provided a projection display unit comprising: a light source for projecting an image; a reflecting mirror for reflecting a light pencil emitted from the light source; a first multilens array for dividing a light pencil gathered by the reflecting mirror into a plurality of light pencils; a second multilens array for forming an image of light pencil emitted from the first multilens array; a polarization conversion element for converting light pencils in an irregular polarization state emitted from the second multilens array into linearly polarized light; a condenser having positive power for superposing the light pencils provided through the second multilens array; a collimator lens having positive power for correcting the angle of a light beam; a display element for forming an image by electric modulation; and a projection lens for enlarging and projecting the image formed on the display element, wherein the second multilens array has lens cells sized larger than those of the first multilens array.

BRIEF DESCRIPTION OF THE DRAWINGS

In the accompanying drawings:

FIGS. 3(a) and 3(b) are views to describe a second embodiment of the invention;

FIG. 4 is a view to describe the second embodiment of the invention;

DETAILED DESCRIPTION OF THE PREFERRED EMBODIMENTS

First Embodiment

Figure 1:
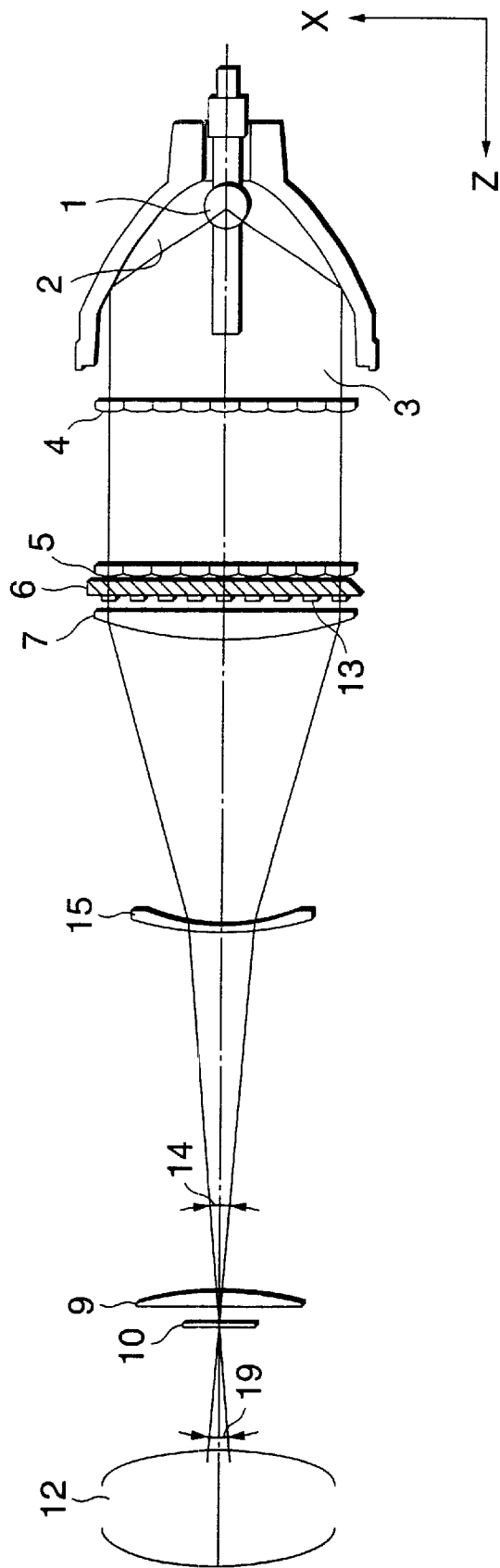
FIG. 1 is a view to describe a first embodiment of the invention.

FIG. 1 shows a first embodiment of the invention. It is a view to show a part of an optical system of a projection display unit (projector) to describe the embodiment.

The projection display unit of the embodiment comprises a light source, a reflecting mirror for reflecting a light pencil emitted from the light source, a multilens array A for dividing a roughly collimated light pencil gathered by the reflecting mirror into a plurality of light pencils, a multilens array B for forming an image of the multilens array A, a polarization conversion element for converting light pencils in an irregular polarization state into linearly polarized light, a condenser having positive power for superposing the light pencils provided through the multilens array, a collimator lens having positive power for correcting the angle of a light beam, a display element for forming an image by electric modulation, and a projection lens for enlarging and projecting the image formed on the display element, characterized in that a lens for correcting the light pencil is disposed between the condenser and the collimator lens.

The lens may be a lens having negative power for correcting the light beam angle of a light pencil incident on the display element.

The embodiment will be discussed in detail with reference to FIG. 2(a).

Figure 2A:
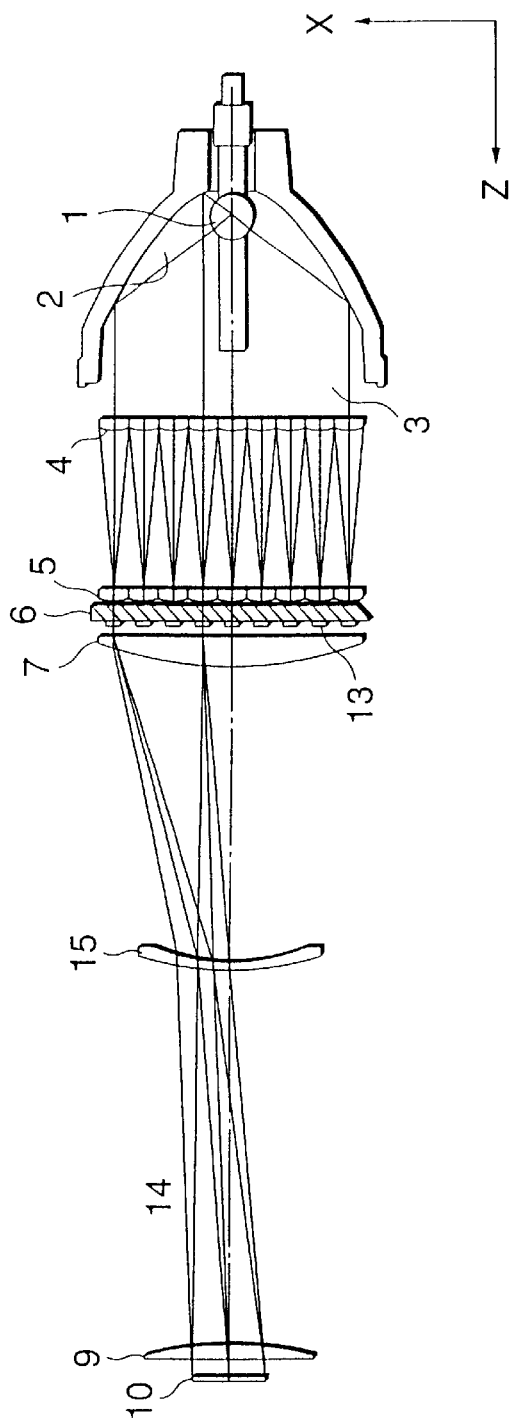
FIGS. 2(a) and 2(b) are views to describe the first embodiment of the invention.

FIG. 2(a) shows a part of the optical system of the projector. In FIG. 2(a), a light pencil emitted from a lamp 1 is reflected by a reflecting mirror 2 to form a roughly collimated light pencil 3. This light pencil 3 is divided into a plurality of light pencils through a multilens array A4 for narrowing the light pencil toward a corresponding multilens array B5. The multilens array B5 has a role of maintaining the corresponding multilens array A4 and a display element 10 in conjugate relation.

Figure 2B:
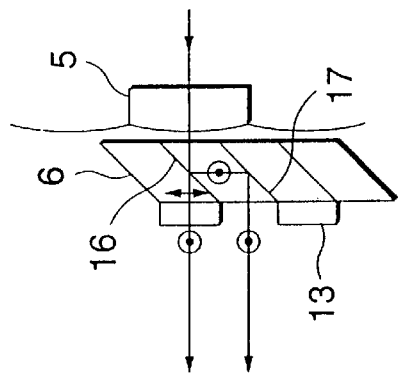

Next, the function of a polarization conversion element 6 will be discussed with reference to FIG. 2(b). The light pencils passing through the multilens array B5 are incident on the polarization conversion element 6. The polarization conversion element 6 comprises an alternating placement pattern of polarization separation films 16 for separating light into two linearly polarized light rays orthogonal to each other and reflecting films 17 for efficiently reflecting one linearly polarized light ray. A phase difference plate 13 for rotating one linearly polarized light ray 90 degrees is disposed on an emission face of the polarization conversion element 6. In FIG. 2(b), the polarization separation film 16 allows the linearly polarized light of the light incident on the polarization conversion element 6 horizontal to the paper plane to travel in a straight line and reflects the linearly polarized light vertical to the paper plane. The linearly polarized light horizontal to the paper plane has a vibration face rotated 90 degrees by means of the phase difference plate 13 and is emitted as linearly polarized light vertical to the paper plane. The linearly-polarized light reflected by the polarization separation film 16 is emitted via the reflecting films 17 as the linearly polarized light vertical to the paper plane intact.

Therefore, the light pencil with the polarized light made uniform is incident on the condenser 7 in FIG. 2(a). The condenser 7 having positive power and a lens 15 having negative power superpose images of the multilens array A4 formed on the multilens array B5 on the display element 10 by the combined lens function. The condenser 7 mainly has a light gathering function and the lens 15 has a function of correcting the angle of a light beam directed to the display element 10. Specifically, the incidence angle of a light beam incident on the display element (light beam angle 14) can be narrowed by disposing the lens 15. Therefore, if the optical path is not lengthened, the incidence angle can be lessened. The projection display unit can also be miniaturized. A collimator lens 9 having positive power before the display element has a function of making even incidence angles of light beams in the display element plane and can suppress change in the optical characteristic depending on the light incidence angle on the display element 10 as much as possible.

Here, the lens having the function of narrowing the incidence angle of a light beam incident on the display element has been described; however, such a lens having a function of correcting aberration caused by another lens and a capability of reducing aberration caused by that lens itself can also be disposed between the condenser and the collimator lens.

Second Embodiment

A second embodiment of the invention will be discussed with reference to FIGS. 3 and 4, each to show a part of an optical system of a projector.

The projection display unit of the embodiment comprises a light source, a reflecting mirror for reflecting a light pencil emitted from the light source, a multilens array A for dividing a roughly collimated light pencil gathered by the reflecting mirror into a plurality of light pencils, a multilens array B for forming an image of the multilens array A, a polarization conversion element for converting light pencils in an irregular polarization state into linearly polarized light, a condenser having positive power for superposing the light pencils provided through the multilens array, a collimator lens having positive power for correcting the angle of a light beam, a display element for forming an image by electric modulation, a projection lens for enlarging and projecting the image formed on the display element, and a lens having negative power for correcting the angle of a light beam, the lens being disposed between the condenser and the collimator lens, characterized in that the following condition is satisfied:

$$0.80 \leq f/L \leq 0.98 \quad (1)$$

where f: Focal distance of condenser
L: Distance from emission face of condenser to incidence face of display element.

FIG. 3(a) is a view to describe a case where the lower limit value of expression (1) is exceeded. Hereinafter, rectangular lenses making up the multilens array will be referred to as lens cells for the description.

If the lower limit value of expression (1) is exceeded, it is advantageous for miniaturizing the optical system because the distance from the condenser 7 to the display element 10 becomes short. However, it becomes difficult to place mirrors, etc., to construct an optical system of a liquid crystal projector. The focal distance of the condenser 7 and the lens 15 becomes short, spherical aberration increases, and it becomes difficult to superpose the lens cells of the multilens array A4 on each other on the display element, as shown in FIG. 3(b). Misaligned images of the lens cells of the multilens array A are formed on the display element indicated by the solid line. As a result, it becomes difficult to make even illumination in the display element plane and in an optical system for combining three colors to produce a full-color image such as a liquid crystal projector, projection image colors get out of balance.

Next, FIG. 4 shows a case where the upper limit value of expression (1) is exceeded. If the upper limit value of expression (1) is exceeded, the effect of light beam angle correction produced through the lens 15 lessens and the light incidence angle on the display element grows. Thus, the optical characteristic depending on the light beam angle of the display element 10 changes and the quality of a projection image is impaired. In addition, it becomes difficult to miniaturize the projection lens and improve the lens performance.

Therefore, if the value is within the range in expression (1), the incidence angle of a light beam incident on the display element can be lessened and it is made possible to miniaturize the projection lens. The illumination in the display element plane can be made even and projection image colors can be kept in balance.

Third Embodiment

A third embodiment of the invention will be discussed with reference to FIG. 5. FIG. 5 shows a part of an optical system of a projector.

The projection display unit of the embodiment comprises a light source, a reflecting mirror for reflecting a light pencil emitted from the light source, a multilens array A for dividing a light pencil gathered by the reflecting mirror into a plurality of light pencils, a multilens array B for forming an image of the multilens array A, a polarization conversion element for converting light pencils in an irregular polarization state into linearly polarized light, a condenser having positive power for superposing the light pencils provided through the multilens array, a collimator lens having positive power for correcting the angle of a light beam, a display element for forming an image by electric modulation, and a projection lens for enlarging and projecting the image formed on the display element, characterized in that the number of lens cells of the multilens array B is smaller than that of the multilens array A.

Figure 5A:
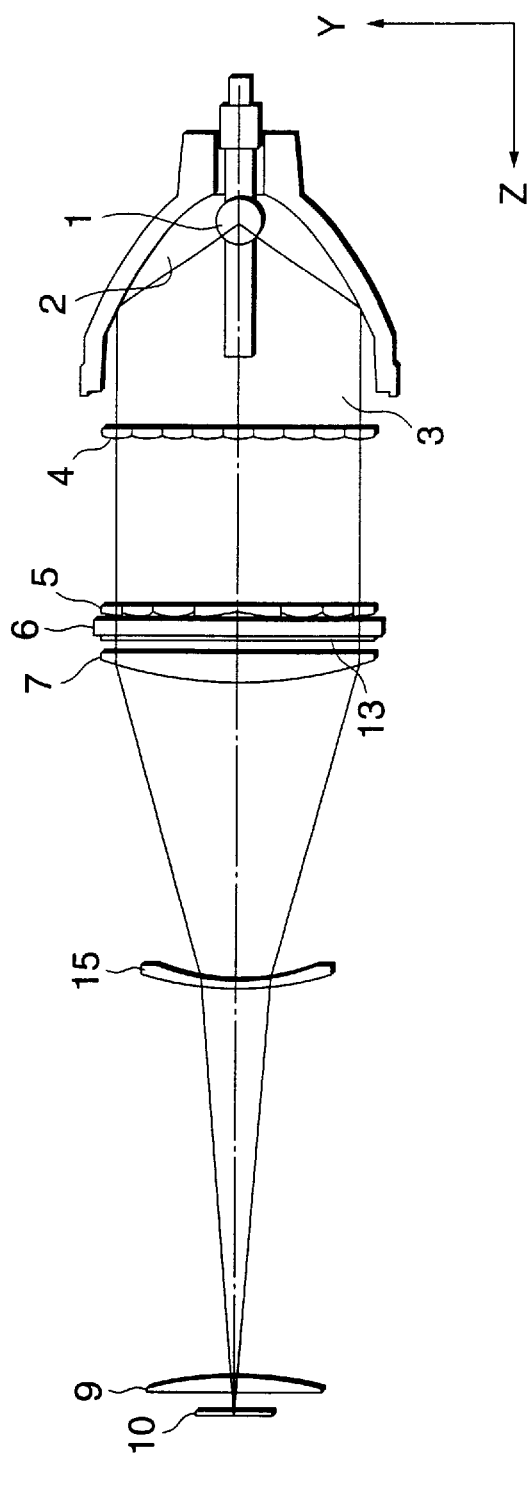
FIGS. 5(a) to 5(c) are views to describe a third embodiment of the invention.
Figure 5C:
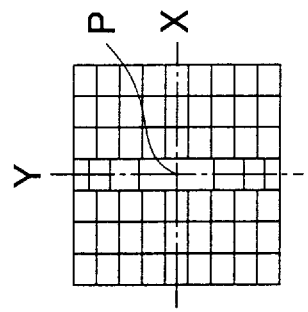
Figure 5B:
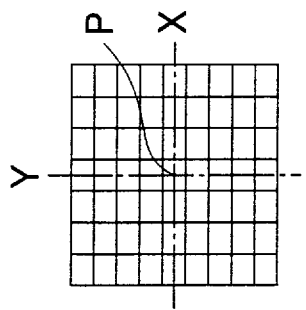

FIG. 5(b) shows the multilens array A and the lens cells are placed symmetrically with an optical axis P which becomes the optical system reference as the center. The multilens array A is characterized by the fact that a lens cell is placed on the optical axis P.

FIG. 5(c) shows the multilens array B and the lens cells are placed symmetrically with the optical axis as the center. The multilens array B is characterized by the fact that a lens cell is not placed on the optical axis P and that the number of lens cells along the Y axis is smaller than that of the multilens array A.

In FIG. 5(a), light emitted from a lamp 1 is reflected by a reflecting mirror 2 and is incident on a multilens array A4 as roughly collimated light 3. At this time, if a light strength distribution on a Y-axis cross section of the light pencil 3 is taken, the light strength in the vicinity of the optical axis weakens schematically as shown in FIG. 6(a), because light is cut off by means of a hole made in a reflecting mirror 2 and the lamp itself. Therefore, the lens cell on the optical axis P of the multilens array A4 does not bear a very important role in the function of the multilens array.

Figure 6C:
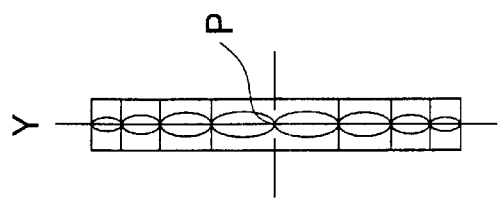
FIGS. 6(a) to 6(c) are views to describe the third embodiment of the invention.
Figure 6B:
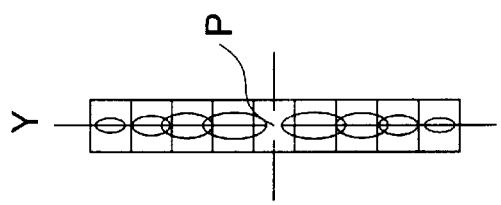
Figure 6A:
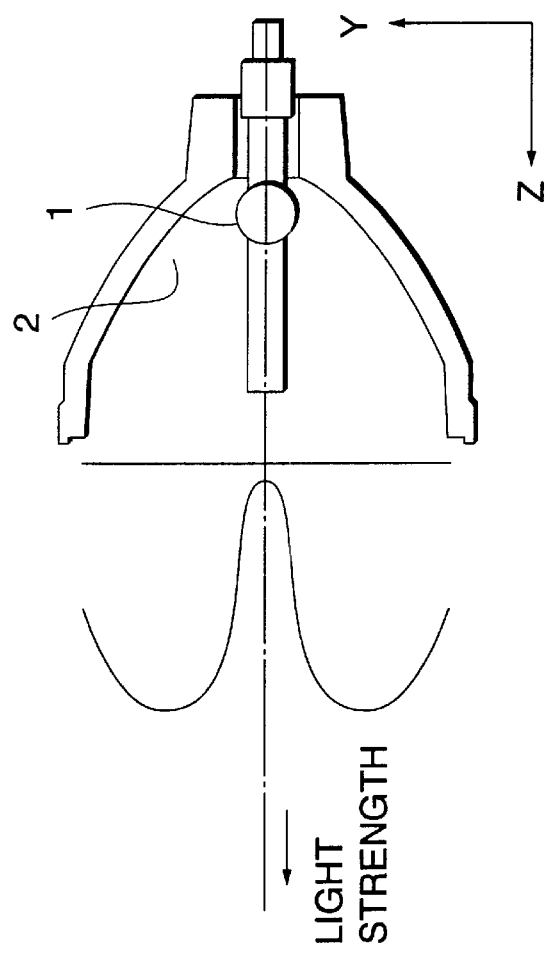

Next, at the position of the multilens array B, conjugate relation with the light emission part of the lamp 1 holds owing to the multilens array A4 and a plurality of lamp light emission part images are formed in the multilens array B5 plane, as shown in FIGS. 6(b) and 6(c) to show extracted Y axis lens cells. FIG. 6B shows a case where the number of Y axis lens cells of the multilens array A4 is the same as that of the multilens array B5. FIG. 6(c), which corresponds to the third embodiment, shows a case where the number of Y axis lens cells of the multilens array B5 is less than that of the multilens array A4 by one.

First, in FIG. 6(b), lamp images formed on the lens cells near the optical axis are large and extend off the lens cells. The extended light off the lens cells does not arrive at the display element and thus has the adverse effect of heat, stray light, etc. In FIG. 6(c), the lens cell of the multilens array B5 corresponding to the lens cell on the optical axis P with weak light strength on the multilens array A4 is deleted. Since the number of Y axis lens cells of the multilens array B5 is reduced, the lens cells above and below the optical axis P can be up sized and the lamp light emission part image can be captured sufficiently.

At this time, misalignment of light beam directions caused by the fact that the multilens arrays A4 and B5 differ in the number of Y axis lens cells can be corrected by shifting the positions of the lens apexes of the lens cells. Specifically, the optical axes of the light beams emitted from the lens cells may be matched with the centers of the lens cells of the multilens array B.

Here, the projection display unit comprising lens 15 disposed between condenser 7 and collimator lens 9 has been described. However, even if the lens 15 does not exist, if the multilens arrays A and B shown in the embodiment are used, the lens cells low in use efficiency can be eliminated and the whole efficiency of the optical system can be enhanced. Further, in the second multilens array, the light use efficiency of the light pencil emitted from the first multilens array can be improved.

Fourth Embodiment

Figure 7A:
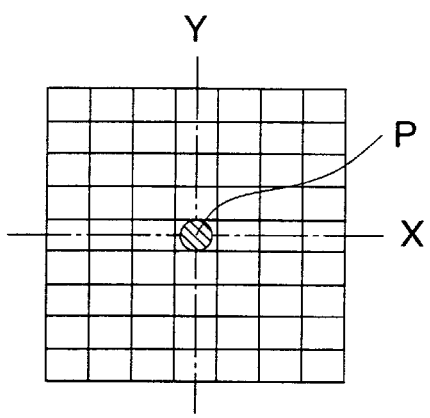
FIGS. 7(a) to 7(d) are views to show different forms of a fourth embodiment of the invention.

A fourth embodiment of the invention will be discussed with reference to FIGS. 7(a) to 7(d). FIGS. 7(a) and 7(c) show lens cells of a multilens array A and FIGS. 7(b) and 7(d) show lens cells of a multilens array B.

The projection display unit of the embodiment comprises a light source, a reflecting mirror for reflecting a light pencil emitted from the light source, a multilens array A for dividing a light pencil gathered by the reflecting mirror into a plurality of light pencils, a multilens array B for forming an image of the multilens array A, a polarization conversion element for converting light pencils in an irregular polarization state into linearly polarized light, a condenser having positive power for superposing the light pencils provided through the multilens array, a collimator lens having positive power for correcting the angle of a light beam, a display element for forming an image by electric modulation, and a projection lens for enlarging and projecting the image formed on the display element, characterized in that the multilens array A has a lens cell on an optical axis and that the multilens array B does not comprise any lens cell corresponding to the lens cell on the optical axis of the multilens array A.

FIG. 7(c) shows the composition wherein there is no lens cell on the optical axis P of the multilens array A. At this time, the hatched area with weak light strength in the vicinity of the optical axis affects four lens cells. The four lens cells are weak partially in light strength in each plane and if the lens cells of the multilens array B corresponding to the four lens cells are deleted as shown in FIG. 7(d), the light use efficiency of the optical system is degraded remarkably.

Figure 7B:
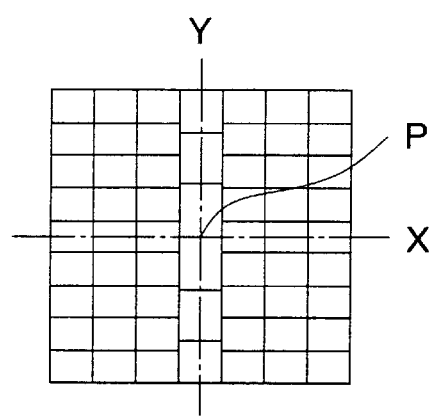
Figure 7C:
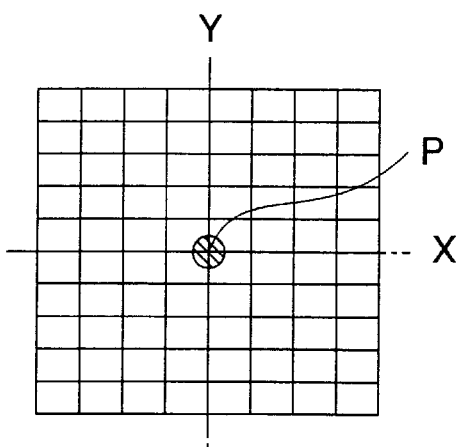
Figure 7D:
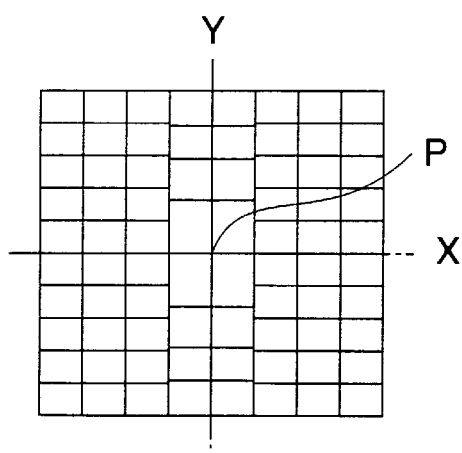

Therefore, as shown in FIG. 7(a), a lens cell is disposed on the optical axis P of the multilens array A, and the corresponding lens cell on the optical axis of the multilens array B is deleted as shown in FIG. 7(b), whereby the light use efficiency of the optical system can be improved.

Figure 8A:
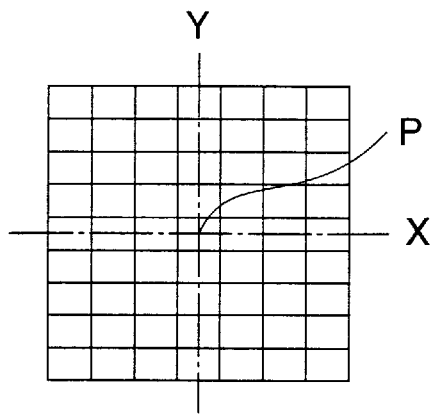
FIGS. 8(a) and 8(b) are views to show different forms of the fourth embodiment of the invention.
Figure 8B:
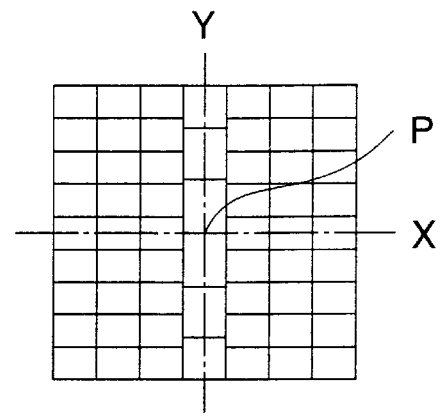

The Y axis lens cells of the multilens array B may be divided in an optimum size matching the lamp light emission part image size; for example, they may be placed as shown in FIG. 8(b).

Figure 9A:
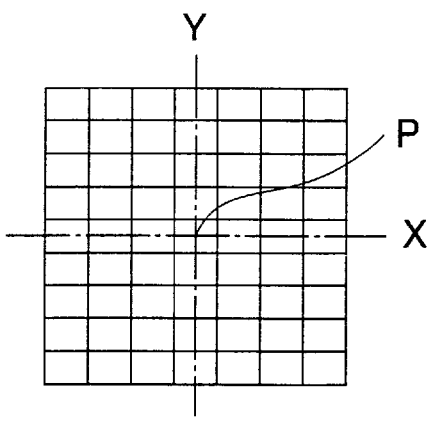
FIGS. 9(a) and 9(b) are views to show different forms of the fourth embodiment of the invention.
Figure 9B:
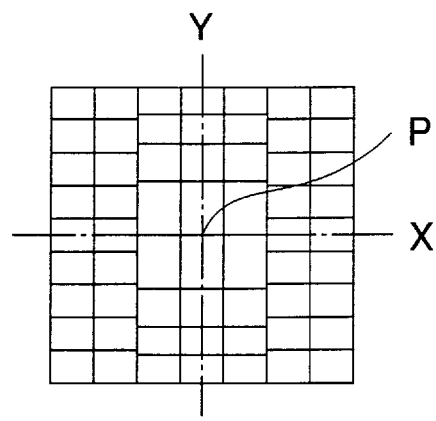

Further, as shown in FIG. 9(b), not only the Y axis lens cells, but also the lens cells of the adjacent columns may be optimized matching the light strength distribution of the light pencil reflected by the reflecting mirror and the lamp light emission part image size on the multilens array B.

Here, the projection display unit comprising lens 15 disposed between condenser 7 and collimator lens 9 has been described. However, even if the lens 15 does not exist, if the multilens arrays A and B shown in the embodiment are used, the lens cells low in use efficiency can be eliminated and the whole efficiency of the optical system can be enhanced. Further, in the second multilens array, the light use efficiency of the light pencil emitted from the first multilens array can be improved.

Fifth Embodiment

Figure 10A:
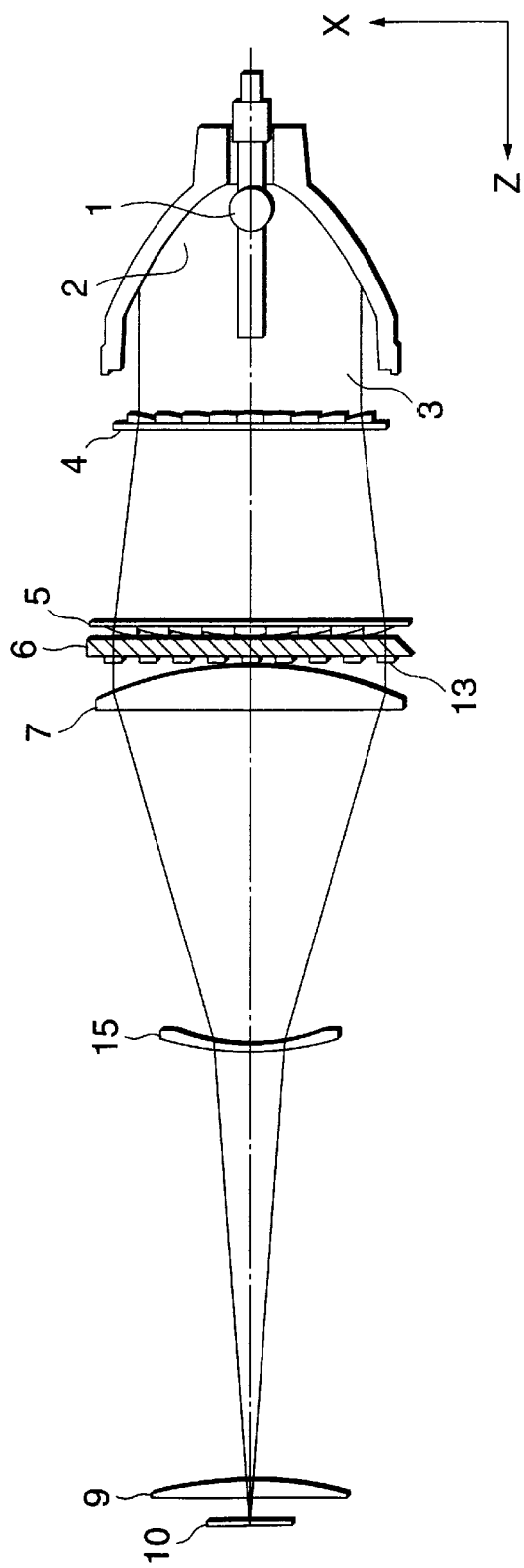
FIGS. 10(a) and 10(b) are views to describe a fifth embodiment of the invention.
Figure 10B:
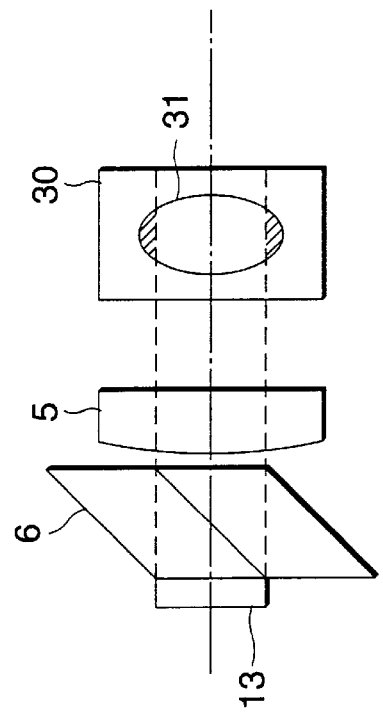

A fifth embodiment of the invention will be discussed with reference to FIGS. 10(a) and 10(b). FIGS. 10(a) and 10(b) show a part of an optical system of a projector. For the description, FIG. 11 shows an optical system in a related art.

The projection display unit of the embodiment comprises a light source, a reflecting mirror for reflecting a light pencil emitted from the light source, a multilens array A for dividing a light pencil gathered by the reflecting mirror into a plurality of light pencils, a multilens array B for forming an image of the multilens array A, a polarization conversion element for converting light pencils in an irregular polarization state into linearly polarized light, a condenser having positive power for superposing the light pencils provided through the multilens array, a collimator lens having positive power for correcting the angle of a light beam, a display element for forming an image by electric modulation, and a projection lens for enlarging and projecting the image formed on the display element, characterized in that the multilens arrays A and B differ in lens cell size.

Figures 11A, 11B:
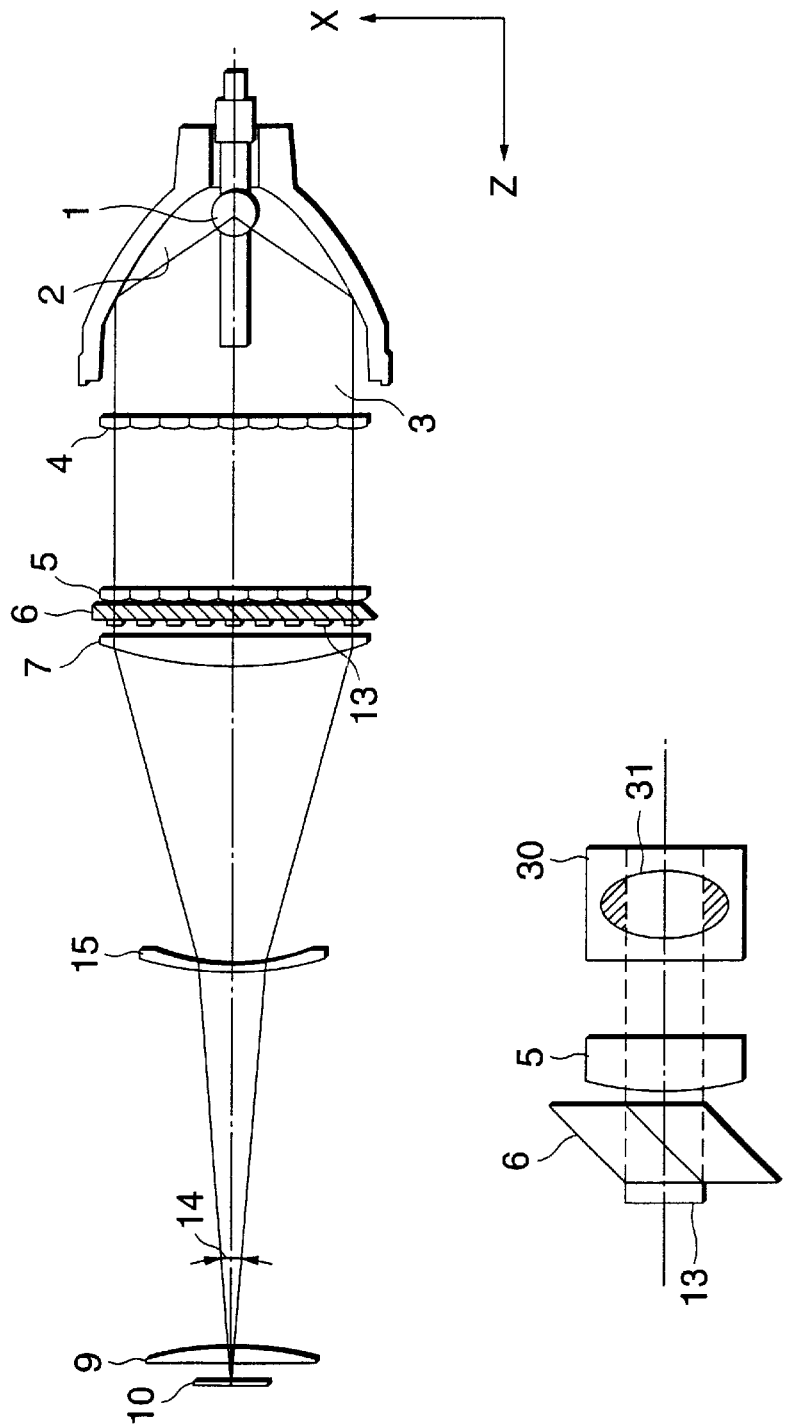
FIGS. 11(a) and 11(b) are views to describe an optical system in a related art.

FIG. 11(a) shows the XZ cross section of the optical system in the related art. Light emitted from a lamp 1 is reflected by a reflecting mirror 2 and is incident on a multilens array A4 as roughly collimated light 3. The light incident on the multilens array A4 is divided into a plurality of light sources and gathered on the corresponding lens cells of the multilens array B5 owing to the lens effect of the multilens array A4. Here, a lens cell of the muitilens array B5 is extracted and shown in FIG. 11(b).

FIG. 11(b) shows a part of the multilens array B5, a part of a polarization conversion element 6, and a lamp light emission part image 31 formed on an incidence face 30 of the extracted lens cell.

The lamp light emission part image 31 is formed in the lens cell 30 of the multilens array B5. However, the area in which efficient polarization conversion can be executed in the polarization conversion element 6 placed following the multilens array B is limited to the range hatched in FIG. 11(b). Therefore, the hatched areas of the lamp light emission part image 31 formed in the lens cell 30 become light pencil low in use efficiency in the optical system.

Next, FIGS. 10(a) and 10(b) show the fifth embodiment. FIG. 10(a) shows the XZ cross section of the optical system. Light emitted from a lamp 1 is reflected by a reflecting mirror 2 and is incident on a multilens array A4 as roughly collimated light 3. The light incident on the multilens array A4 is divided into a plurality of light sources and gathered on the corresponding lens cells of the multilens array B5 owing to the lens effect of the multilens array A4.

Here, the multilens array B5 has a larger lens cell size than the multilens array A4. Misalignment of light beam directions caused by the fact that the multilens arrays A4 and B5 differ in lens cell size can be corrected by shifting the positions of the lens apexes of the lens cells.

FIG. 10(b) shows a part of the multilens array B5, a part of a polarization conversion element 6, and a lamp light emission part image 31 formed on an incidence face 30 of a lens cell.

The lamp light emission part image 31 is formed in the lens cell 30 and the lens cell 30 of the multilens array B5 and the polarization conversion element 6 are up sized, so that the light that can be used for polarization conversion is increased and the efficiency of the optical system can be enhanced.

Here, the projection display unit comprising lens 15 disposed between condenser 7 and collimator lens 9 has been described. However, even if the lens 15 does not exist, if the multilens arrays A and B shown in the embodiment are used, the lens cells low in use efficiency can be eliminated and the whole efficiency of the optical system can be enhanced. Further, in the second multilens array, the light use efficiency of the light pencil emitted from the first multilens array can be improved.

Sixth Embodiment

Figure 12B:
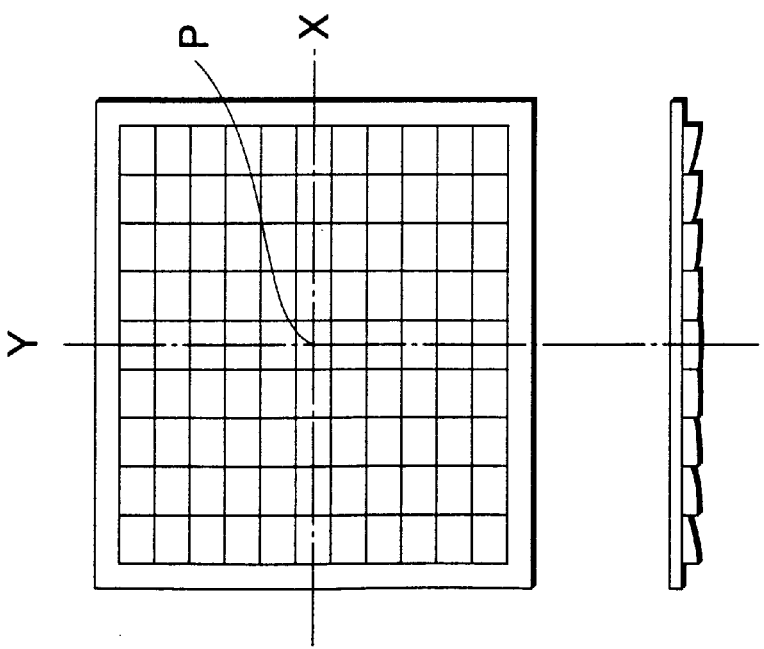
FIGS. 12(a) and 12(b) are views to describe a sixth embodiment of the invention.
Figure 12A:
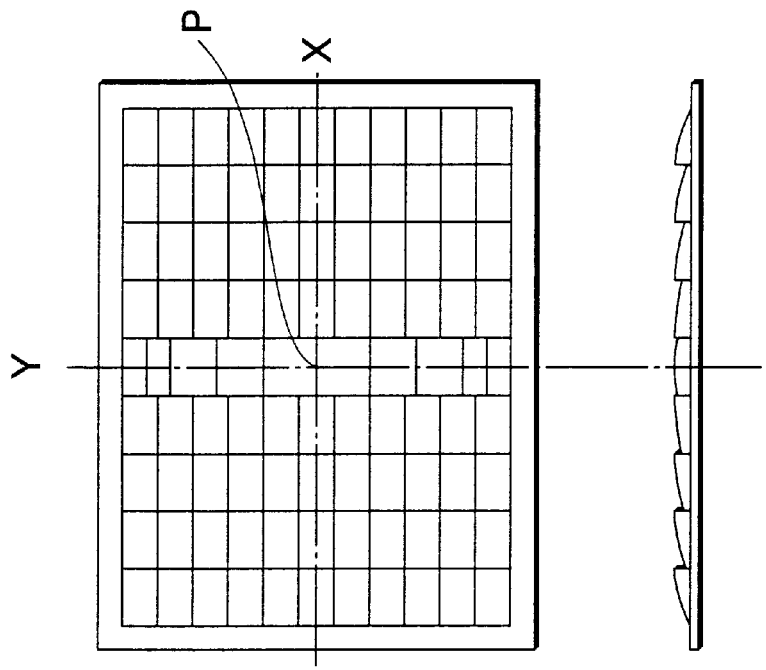

A sixth embodiment of the invention will be discussed with reference to FIGS. 12(a) and 12(b). FIGS. 12(a) and 12(b) show a multilens array A4 and a multilens array B5.

The projection display unit of the embodiment comprises a light source, a reflecting mirror for reflecting a light pencil emitted from the light source, a multilens array A for dividing a light pencil gathered by the reflecting mirror into a plurality of light pencils, a multilens array B for forming an image of the multilens array A, a polarization conversion element for converting light pencils in an irregular polarization state into linearly polarized light, a condenser having positive power for superposing the light pencils provided through the multilens array, a collimator lens having positive power for correcting the angle of a light beam, a display element for forming an image by electric modulation, and a projection lens for enlarging and projecting the image formed on the display element, characterized in that the multilens array A has lens cells sized uniformly in X and Y directions and that the multilens array B has lens cells sized uniformly in the X direction and larger than the lens cells of the multilens array A in the X direction and sized differently in the Y direction in the plane.

FIG. 12(a) shows the multilens array A4, which has lens cells sized uniformly in the X and Y directions in the plane. A lens cell is placed on an optical axis P.

FIG. 12(b) shows the multilens array B5, which has lens cells sized larger than the lens cells of the multilens array A4 in the X direction and sized uniformly in the X direction in the plane. The lens cells of the multilens array B5 are sized uniformly in the X direction, thereby making it possible to place polarization separation films and phase difference plates at equal intervals in the polarization conversion element placed following the multilens array B5.

The lens cell size in the Y direction is optimized matching a lamp light emission part image formed on the multilens array B5, and the lens cells are sized differently in the Y direction in the plane. Thus, it is made possible to allow light to efficiently pass through the multilens array B and the polarization conversion element, and the light use efficiency of the optical system can be enhanced.

Figure 13:
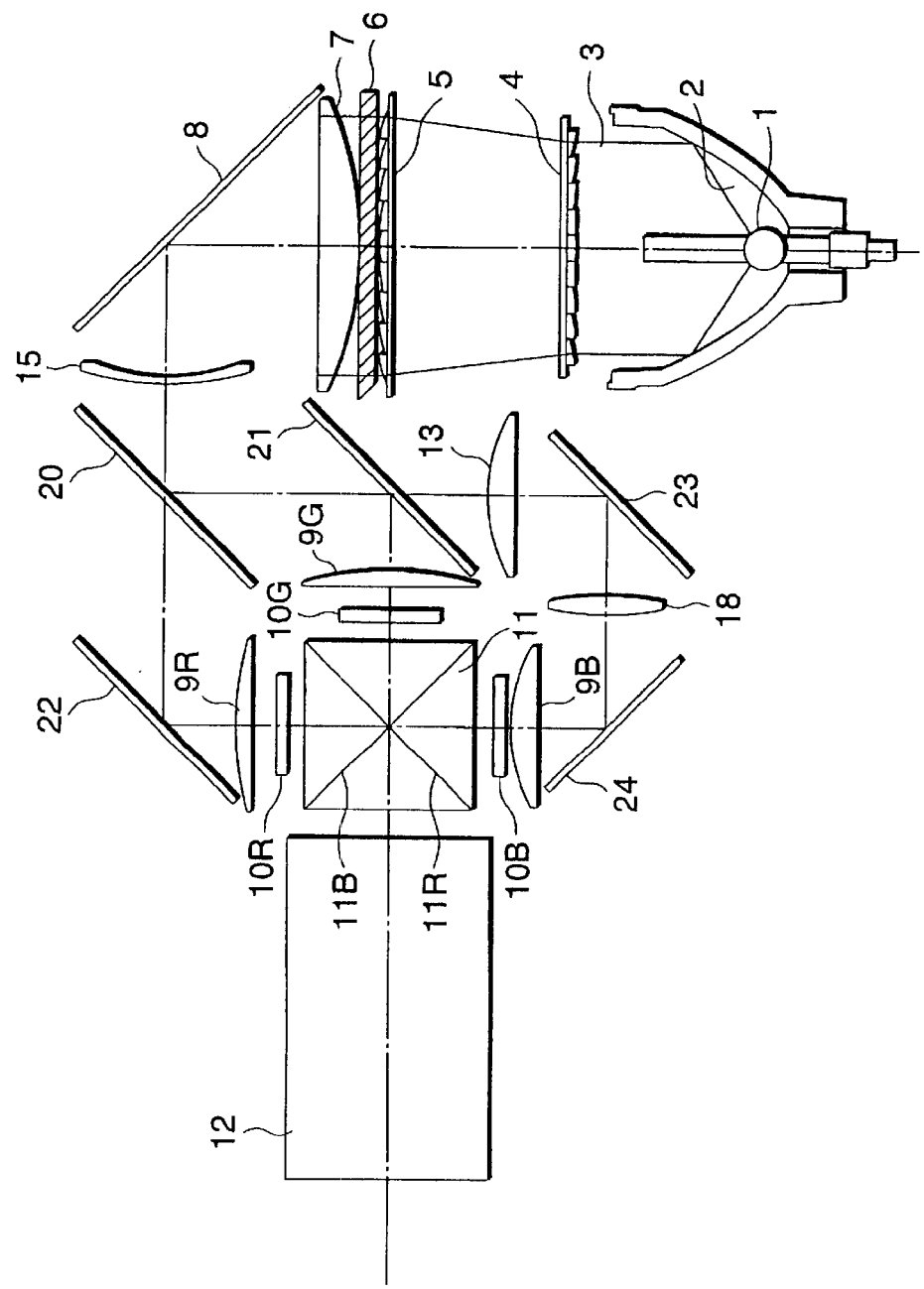
FIG. 13 is a view to show an application example of the sixth embodiment of the invention to a projector.
Figure 14:
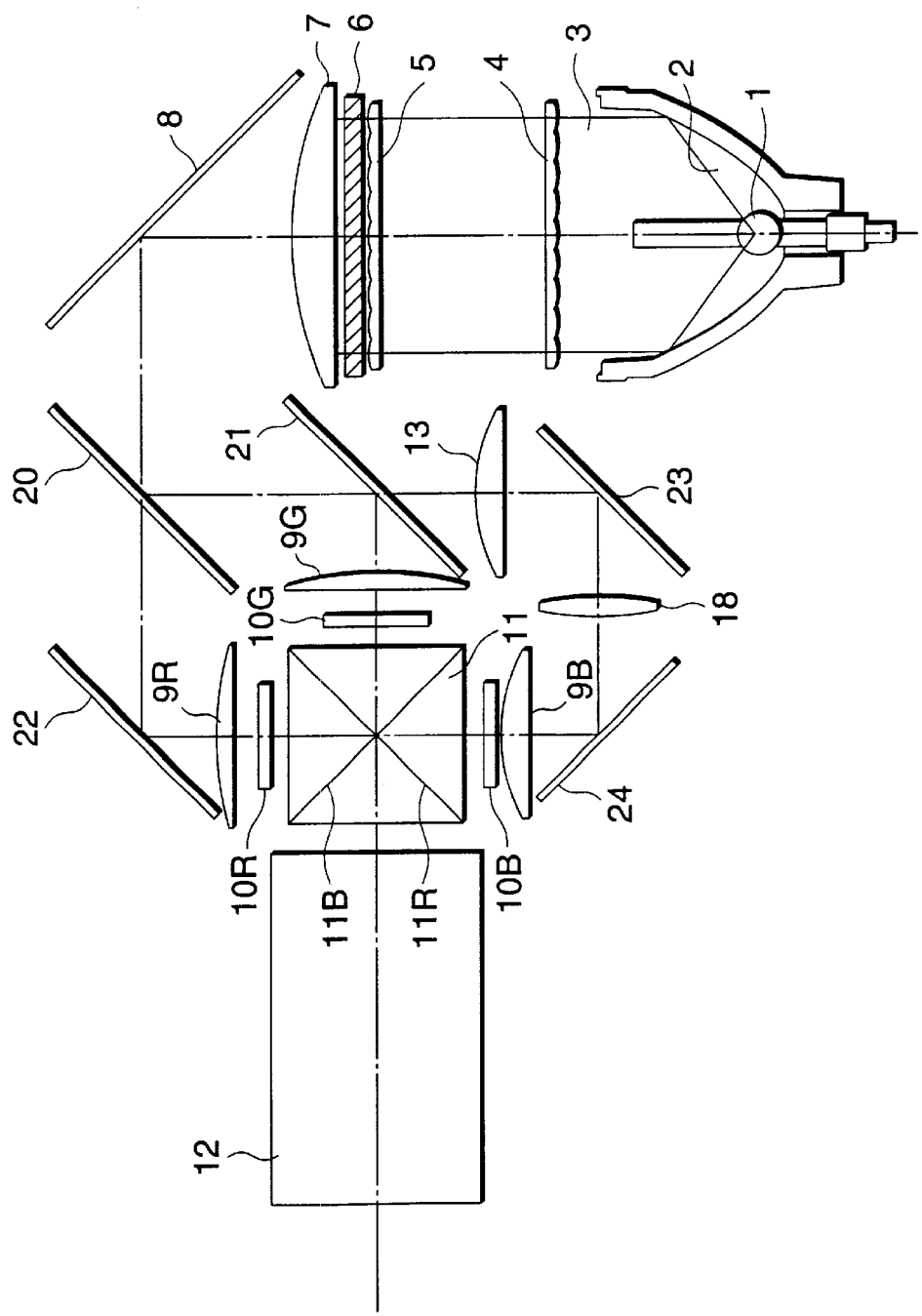
FIG. 14 is a view to describe an optical system in a related art.
Figure 15:
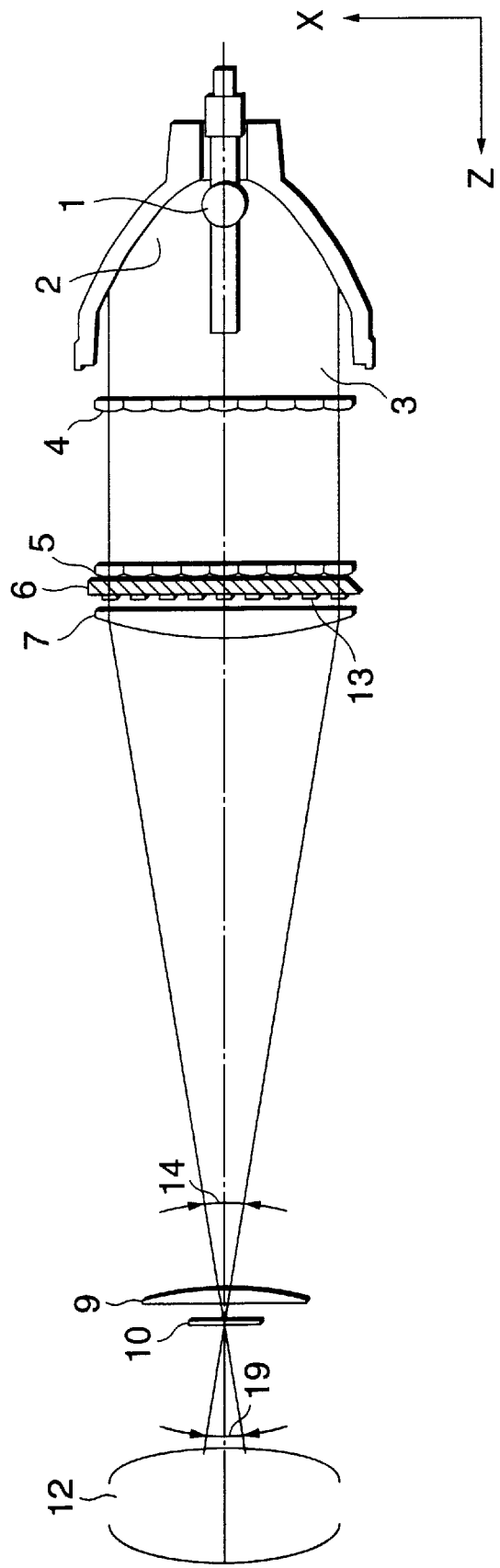
FIG. 15 is a view to describe a problem in the optical system in the related art.
Figure 16:
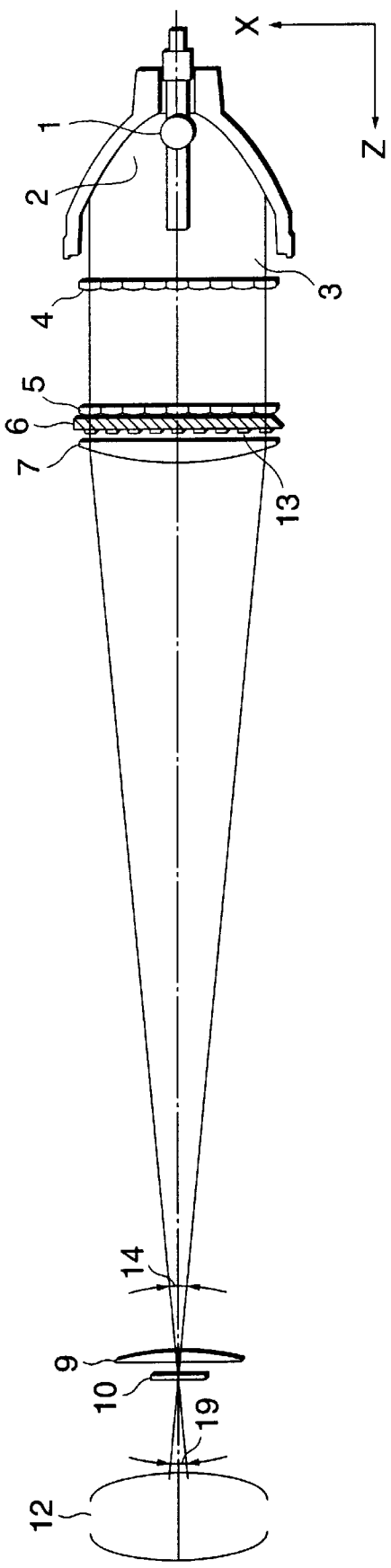
FIG. 16 is a view to describe a problem in the optical system in the related art.
Figure 17:
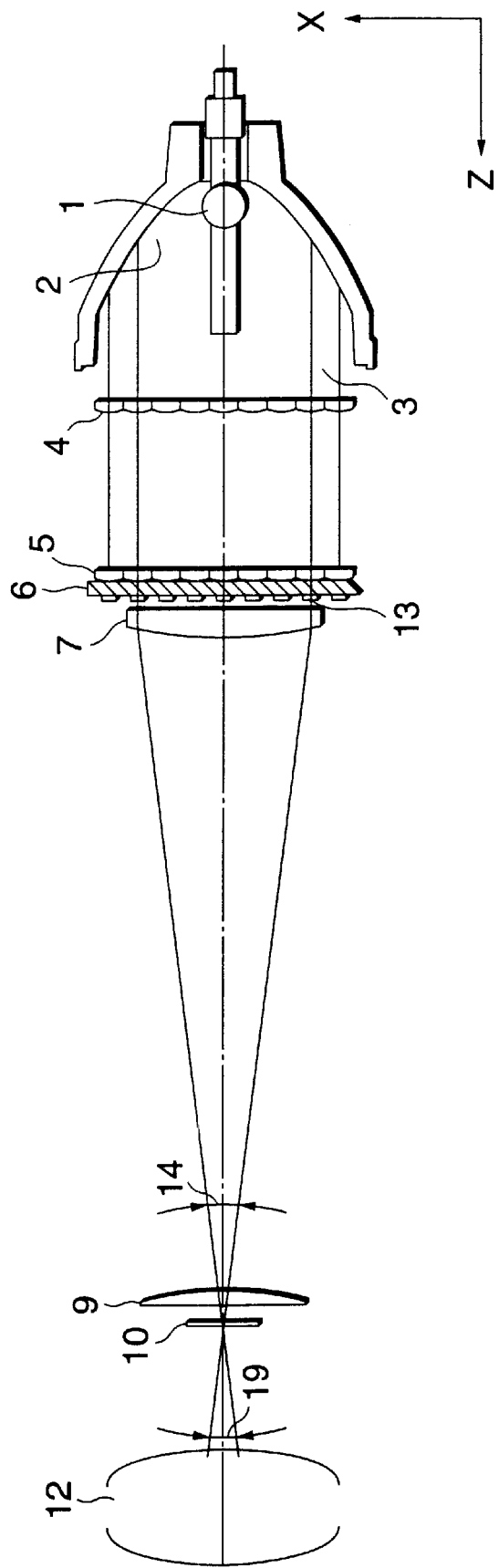
FIG. 17 is a view to describe a problem in the optical system in the related art.

FIG. 13 is a view to show the configuration of applying the embodiment to an optical system of a projector. A highly efficient optical system while it is small-sized can be provided as compared with the optical system in the related art.

Here, the projection display unit comprising lens 15 disposed between condenser 7 and collimator lens 9 has been described. However, even if the lens 15 does not exist, if the multilens arrays A and B shown in the embodiment are used, the lens cells low in use efficiency can be eliminated and the whole efficiency of the optical system can be enhanced. Further, in the second multilens array, the light use efficiency of the light pencil emitted from the first multilens array can be improved.

According to the first aspect of the invention, the projection display unit comprises a light source for projecting an image, a reflecting mirror for reflecting a light pencil emitted from the light source, a first multilens array for dividing a light pencil gathered by the reflecting mirror into a plurality of light pencils, a second multilens array for forming an image of light pencil emitted from the first multilens array, a polarization conversion element for converting light pencils in an irregular polarization state emitted from the second multilens array into linearly polarized light, a condenser having positive power for superposing the light pencils provided through the second multilens array, a collimator lens having positive power for correcting the angle of a light beam, a display element for forming an image by electric modulation, a projection lens for enlarging and projecting the image formed on the display element, and a correction lens being disposed between the condenser and the collimator lens for correcting a light pencil incident on the display element. Thus, the lens for correcting the incidence angle of a light beam is disposed between the condenser having positive power and the collimator lens having positive power placed in the optical system, whereby the optical system can be miniaturized, it is made possible to lessen the light incidence angle on the display element, the projection lens can be miniaturized, and change in the characteristic depending on the light incidence angle on the display element can be reduced.

According to the second aspect of the invention, the projection display unit comprises a light source for projecting an image, a reflecting mirror for reflecting a light pencil emitted from the light source, a first multilens array for dividing a light pencil gathered by the reflecting mirror into a plurality of light pencils, a second multilens array for forming an image of light pencil emitted from the first multilens array, a polarization conversion element for converting light pencils in an irregular polarization state emitted from the second multilens array into linearly polarized light, a condenser having positive power for superposing the light pencils provided through the second multilens array, a collimator lens having positive power for correcting the angle of a light beam, a display element for forming an image by electric modulation, and a projection lens for enlarging and projecting the image formed on the display element, wherein that the number of lens cells of the second multilens array is less than that of the first multilens array. Thus, the lens cells low in use efficiency can be eliminated and the whole efficiency of the optical system can be improved, making it possible to enhance light output of the projection display unit.

According to the third aspect o-f the invention, the projection display unit comprises a light source for projecting an image, a reflecting mirror for reflecting a light pencil emitted from the light source, a first multilens array for dividing a light pencil gathered by the reflecting mirror into a plurality of light pencils, a second multilens array for forming an image of light pencil emitted from the first multilens array, a polarization conversion element for converting light pencils in an irregular polarization state emitted from the second multilens array into linearly polarized light, a condenser having positive power for superposing the light pencils provided through the second multilens array, a collimator lens having positive power for correcting the angle of a light beam, a display element for forming an image by electric modulation, and a projection lens for enlarging and projecting the image formed on the display element, wherein that the second multilens array has lens cells sized larger than those of the first multilens array. Thus, in the second multilens array, the light use efficiency of the light pencil emitted from the first multilens array can be improved, and the whole efficiency of the optical system can be improved, making it possible to enhance light output of the projection display unit.

What is claimed is:

1. A projection display unit comprising:
   a light source for projecting an image;
   a reflecting mirror for reflecting a light pencil emitted from said light source;
   a first multilens array for dividing a light pencil gathered by said reflecting mirror into a plurality of light pencils;
   a second multilens array for forming an image of light pencil emitted from said first multilens array;
   a polarization conversion element for converting light pencils in an irregular polarization state emitted from said second multilens array into linearly polarized light;
   a condenser having positive power for superposing the light pencils provided through said second multilens array;
   a collimator lens having positive power for correcting the angle of a light beam;
   a display element for forming an image by electric modulation;
   a projection lens for enlarging and projecting the image formed on said display element; and
   a correction lens being disposed between said condenser and said collimator lens for correcting a light pencil incident on said display element.

2. The projection display unit as claimed in claim 1, wherein said correction lens lessens the incidence angle of the light pencil incident on said display element and has negative power.

3. The projection display unit as claimed in claim 1, wherein for said correction lens, the focal distance of said condenser and the distance from an emission face of said condenser to an incidence face of said display element satisfy the following condition:

$$0.80 \leq f/L \leq 0.98$$

where f: Focal distance of condenser
   L: Distance from emission face of condenser to incidence face of display element.

4. The projection display unit as claimed in claim 1, wherein said first multilens array has a predetermined number of lens cells for dividing an incident light pencil into a plurality of light pencils, and
   wherein said second multilens array has-a fewer number of lens cells than said first multilens array has.

5. The projection display unit as claimed in claim 4, wherein said second multilens array has lens cells positioned above and below the optical axis, sized larger than other lens cells.

6. The projection display unit as claimed in claim 4, wherein said second multilens array has lens cells sized smaller as the lens cells are away from the optical axis in an up and down direction of the optical axis.

7. The projection display unit as claimed in claim 1, wherein said second multilens array does not comprise a lens cell corresponding to a lens cell provided on an optical axis of said first multilens array.

8. The projection display unit as claimed in claim 1, wherein said second multilens array has lens cells sized larger than those of said first multilens array.

9. The projection display unit as claimed in claim 1, wherein said first multilens array has lens cells sized uniformly in X and Y directions, and
   wherein said second multilens array has lens cells sized uniformly in the X direction and larger than the lens cells of said first multilens array in the X direction and sized differently in the Y direction in the plane.

10. A projection display unit comprising:
    a light source for projecting an image;
    a reflecting mirror for reflecting a light pencil emitted from said light source;
    a first multilens array for dividing a light pencil gathered by said reflecting mirror into a plurality of light pencils;
    a second multilens array for forming an image of light pencil emitted from said first multilens array;
    a polarization conversion element for converting light pencils in an irregular polarization state emitted from said second multilens array into linearly polarized light;
    a condenser having positive power for superposing the light pencils provided through said second multilens array;

a collimator lens having positive power for correcting the angle of a light beam;

a display element for forming an image by electric modulation; and a projection lens for enlarging and projecting the image formed on said display element, wherein the number of lens cells of said second multilens array is less than that of said first multilens array.

11. The projection display unit as claimed in claim 10, wherein said second multilens array does not comprise a lens cell corresponding to a lens cell provided on an optical axis of said first multilens array.

12. The projection display unit as claimed in claim 10, wherein said second multilens array has lens cells positioned above and below the optical axis, sized larger than other lens cells.

13. The projection display unit as claimed in claim 10, wherein said second multilens array has lens cells sized smaller as the lens cells are away from the optical axis in an up and down direction of the optical axis.

14. A projection display unit comprising:

a light source for projecting an image;

a reflecting mirror for reflecting a light pencil emitted from said light source;

a first multilens array for dividing a light pencil gathered by said reflecting mirror into a plurality of light pencils;

a second multilens array for forming an image of light pencil emitted from said first multilens array;

a polarization conversion element for converting light pencils in an irregular polarization state emitted from said second multilens array into linearly polarized light;

a condenser having positive power for superposing the light pencils provided through said second multilens array;

a collimator lens having positive power for correcting the angle of a light beam;

a display element for forming an image by electric modulation; and a projection lens for enlarging and projecting the image formed on said display element, wherein said second multilens array has lens cells sized larger than those of said first multilens array.

15. The projection display unit as claimed in claim 14, wherein said first multilens array has lens cells sized uniformly in X and Y directions, and wherein said second multilens array has lens cells sized uniformly in the X direction and larger than the lens cells of said first multilens array in the X direction and sized differently in the Y direction in the plane.

* * * * *